United States Patent Office.

ASHEL J. DENISON, OF PARIS, MICHIGAN.

Letters Patent No. 90,347, dated May 25, 1869.

---

IMPROVED COMPOUND FOR THE CURE OF DIPHTHERIA, &c.

---

The Schedule referred to in these Letters Patent and making part of the same.

---

*To all whom it may concern:*

Be it known that I, ASHEL J. DENISON, of the township of Paris, county of Kent, and State of Michigan, have invented a new and useful composition of matter to be used as a remedy for diphtheria, bronchitis, whooping-cough, catarrh, dropsy, sore eyes, neuralgia, toothache, headache, and many other kinds of diseases, and for all kinds of wounds, sprains, bruises, sores, and pains, and called by me "Golden Oil;" and I do declare the following to be a full, clear, and exact description of the manner of compounding and using the same.

My invention consists of a liquid preparation, formed by the mechanical mixture of various ingredients well known to commerce, in certain stated proportions, to be taken internally in suitable doses, or to be used externally in suitable quantities, by those who are afflicted with the diseases or maladies for the relief and cure of which this preparation is adapted.

To enable others to make and compound my invention, I will proceed to give the ingredients of which it is composed, state the proportions in which the same are used, and also the manner in which my invention is compounded.

In the preparation of a quantity of the golden oil, there should be used, sixteen parts, in weight, of oil hemlock, (*Pix liquida;*) eight parts, in weight, of the oil of cedar, (*Juniperus Virginiana;*) eight parts, in weight, of the oil origanum, (*Origani;*) three parts, in weight, of the oil of anise, (*Anisi;*) thirty-two parts, in weight, of gum-camphor, (*Camphora;*) ten hundred and twenty-four parts, in weight, of oil linseed, (*Lini;*) eight parts, in weight, oil sassafras, (*Sassafras;*) and two parts, in weight, extract rosin-weed.

The several ingredients above named, in the proportions above specified, should be mixed together thoroughly in some suitable vessel, and placed in a warm place, and shaken up occasionally. It should be allowed to remain in the vessel for about the space of twelve hours, and then is ready for use.

The linseed-oil should be used in its natural state or condition.

The mixing the ingredients is only mechanical, and they may be used in the state and condition in which they are prepared for sale in commerce.

My invention is designed as a remedy for diphtheria, bronchitis, whooping-cough, catarrh, dropsy, sore eyes, neuralgia, toothache, headache, and many other kinds of diseases, and for all kinds of wounds, sprains, bruises, sores, and pains.

It should be taken internally in small doses, of from fifteen to twenty drops, two or three times a day, according to the condition of the disease, and at the same time the parts afflicted should be freely bathed with the oil.

The use of my invention, in the manner above described, will give relief in all cases, and in nearly every case effect a permanent cure of the diseases and maladies for which it is designed as a remedy.

What I claim to have invented, and desire to secure by Letters Patent of the United States of America, is—

The composition of a remedy called golden oil, from the ingredients named above, compounded and prepared substantially as and for the purposes above set forth.

ASHEL J. DENISON.

Witnesses:
EDWARD TAGGERT,
MARK M. POWERS.